US009435672B2

(12) United States Patent
Chemisky et al.

(10) Patent No.: US 9,435,672 B2
(45) Date of Patent: Sep. 6, 2016

(54) MEASUREMENT TRANSDUCER FOR PROCESS INSTRUMENTATION, AND METHOD FOR MONITORING THE STATE OF ITS SENSOR

(71) Applicant: Siemens Aktiengesellschaft, Munich (DE)

(72) Inventors: Eric Chemisky, Soultz sous forets (FR); Slava Friesen, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/774,238

(22) PCT Filed: Jan. 20, 2014

(86) PCT No.: PCT/EP2014/050982
§ 371 (c)(1),
(2) Date: Sep. 10, 2015

(87) PCT Pub. No.: WO2014/161676
PCT Pub. Date: Oct. 9, 2014

(65) Prior Publication Data
US 2016/0025528 A1    Jan. 28, 2016

(30) Foreign Application Priority Data

Apr. 3, 2013  (DE) .................. 10 2013 205 864

(51) Int. Cl.
*G01D 18/00*  (2006.01)
(52) U.S. Cl.
CPC .................. *G01D 18/00* (2013.01)

(58) Field of Classification Search
CPC ........ G01D 18/00; G01P 21/00; G01R 35/04
USPC ............. 73/1.01; 324/74; 330/261; 323/316; 702/64
See application file for complete search history.

(56) References Cited

U.S. PATENT DOCUMENTS

| 6,078,168 A * | 6/2000 | Paolo ...................... G05F 3/225 323/226 |
| 7,834,695 B2 * | 11/2010 | Esch ................... H03F 3/45085 330/257 |
| 2011/0037456 A1 * | 2/2011 | Chemisky ............ G01D 3/0365 324/105 |
| 2015/0365003 A1 * | 12/2015 | Sadwick ................ H02M 3/28 363/21.01 |

FOREIGN PATENT DOCUMENTS

| DE | 19951817 A1 | 5/2001 |
| EP | 0419990 A2 | 4/1991 |
| EP | 1248175 A2 | 10/2002 |
| EP | 2269009 B1 | 1/2011 |
| FR | 2757283 A1 | 6/1998 |

* cited by examiner

*Primary Examiner* — Lisa Caputo
*Assistant Examiner* — Nigel Plumb
(74) *Attorney, Agent, or Firm* — Cozen O'Connor

(57) ABSTRACT

A measurement transducer for process instrumentation includes a sensor for detecting a physical or chemical quantity, where a supply voltage to the sensor is regulated by a cross regulator to a constant value, and the current intensity of the current adjusted by the cross regulator and flowing parallel to the sensor is determined and monitored to maintain a specified criterion in order to detect a sensor error such that error conditions of the sensor can be determined in a particularly simple and effective way.

7 Claims, 3 Drawing Sheets

MEASUREMENT TRANSDUCER FOR PROCESS INSTRUMENTATION, AND METHOD FOR MONITORING THE STATE OF ITS SENSOR

CROSS-REFERENCE TO RELATED APPLICATIONS

This is a U.S. national stage of application No. PCT/EP2014/050982 filed 20 Jan. 2014. Priority is claimed on German Application No. 10 2013 205 864.0 filed 3 Apr. 2013, the content of which is incorporated herein by reference in its entirety.

BACKGROUND OF THE INVENTION

1. Field of the Invention

The invention relates to a measurement transducer for process instrumentation having a sensor for detecting a physical or chemical quantity and to a method for monitoring the state of the sensor.

2. Description of the Related Art

Various field devices for the process instrumentation are used in process engineering systems to control processes. Measurement transducers are used, for instance, to detect process variables, such as temperature, pressure, throughflow rate, fill level, density or gas concentration of a medium. With the aid of a sensor, which is frequently attached to a planar substrate, the physical or chemical quantity is converted into an electrical measuring signal. This planar substrate is then used to mechanically fix the sensitive sensor to a support and also to protect against external influences, such as to improve electromagnetic compatibility. Particularly, with piezoresistive pressure sensors, there is the possibility of attaching electrical sensor elements of the sensor to the substrate in that these elements are embedded in the substrate and the substrate is doped in the vicinity of these elements, where electrical contact is established between the electrical element and the substrate. A PN junction in the manner of a diode provides for electrical separation of the element and the substrate when an adequate voltage is applied. Electric lines, which convey signals from the sensor to external contacts, are connected to an actuation and evaluation facility to evaluate the signals, where the facility outputs a measured value corresponding to the respective pressure to a control station or a programmable logic controller via a field bus.

EP 2 269 009 B1 discloses a measurement transducer for process instrumentation, in which the state of a substrate, which supports electrical elements of a sensor to generate a measuring signal, is monitored for changes due to chemical contamination. In addition, the sensor elements and their connecting lines are monitored for breakage, in other words for the occurrence of an electrical interruption.

The detection of a sensor breakage can occur, for instance, by measuring the current consumption of the measuring resistances connected to a Wheatstone bridge, where the measuring resistances generally are referred to as sensor elements. The temperature sensitivity of these resistances is relatively high compared with their pressure sensitivity. As a result, an extremely accurate determination of the consumed current with additional temperature compensation is required. The extremely precise measuring electronics required herefor is disadvantageously associated with a high outlay on account of the required low component distribution. Since more and more applications of measurement transducers require very high reliability when measuring physical or chemical quantities, which is to be confirmed by corresponding certifications, for instance pertaining to International Electrotechnical Commission (IEC) standard 61508, it is however rarely possible to dispense with monitoring the sensor for malfunctions or breakages. In such cases, a malfunction of a sensor can inter alia be caused by a tearing of signal and/or supply wires, which can be formed as lines on the substrate or as bonding wires, or for instance in the case of resistive pressure sensors by a breakage of the material doped on the substrate.

SUMMARY OF THE INVENTION

In view of the foregoing, it is an object of the invention to provide a measurement transducer for process instrumentation, in which the state of a sensor can be monitored for tears or breakages in the sensor or in supply lines in a reliable and low cost manner.

This and other objects and advantages are achieved in accordance with the invention by a monitoring method and measurement transducer in which a cross regulator, also referred to as parallel regulator or shunt regulator, is connected in parallel with the sensor and consumes as much current as must be conveyed across the resistance connected in series with the sensor, so that the voltage dropping at a resistance and thus the supply voltage of the sensor is kept constant. If the sensor consumes a higher current, the current adjusted by the cross regulator thus reduces accordingly. Conversely, the cross regulator adjusts a higher current if a lower current flows across the sensor on account of its temperature dependency, for instance. Since the supply voltage of the sensor is kept constant by the cross regulator, this is largely independent of the temperature. This is advantageous in that a possibly non-linear dependency of the measuring signal on the voltage supply of the sensor does not affect the measurement accuracy of the measurement transducer. The indirect measurement of the current consumed by the sensor and its monitoring for detecting a malfunction or breakage is advantageous here in that it has a comparatively low sensitivity compared with a component distribution in the evaluation electronics.

The disclosed invention is thus advantageous in that a sensor, which is provided to detect a physical or chemical quantity in a measurement transducer, can be monitored for changes in a particularly simple and low cost manner, where the changes are associated, for instance, with the formation of a crack in the substrate or a wire breakage. In such cases, it may occur that a crack formation in the substrate already results in a detectable change in the current adjusted by the cross regulator and flowing in parallel to the sensor, while in the sensor only a creeping change to its property used to generate the measuring signal and thus a displacement of the measured value, a so-called drifting, is caused, which expresses itself solely as an error in the measured value and could not be recognized as a fault without using the cross regulator with current evaluation. The reliability of the measured values provided by the measurement transducer is thus also improved. If an error occurs, which is recognized for instance as excessive current, the measurement transducer outputs a fault message and a process, in which the measurement transducer is used, can be brought into a safer state if necessary. The number of possible errors, which result in a safer state, i.e., the "Safe Failure Fraction (SFF)" is thus increased.

As already mentioned above, the sum of the current consumed by the sensor and the cross regulator connected in parallel thereto is largely constant. Therefore, exemplary specific fluctuations in the current consumption barely occur. Moreover, with a modular design of the sensor unit and activation and evaluation electronics, no exemplary specific adjustments to the interface need to be performed on the respective current consumption of the sensor unit. The disclosed invention therefore acts favorably on the modularity of the measurement transducer. This is particularly advantageous with a configuration of a measurement transducer, in which a sensor unit has to be arranged separately from an activation and evaluation facility. For instance, in one embodiment of a sensor unit for use in areas of zone 0 where there is a risk of explosion, the sensor unit is to be arranged within a tank, whereas the associated activation and evaluation facility, which is only suited to areas of zone 1 where there is a risk of explosion, is disposed outside of the tank.

A particularly good responsiveness to the monitoring can be achieved if the sensor temperature is determined in the sensor unit and in each case assigned limit values, the exceedence of which is monitored as a predetermined criterion for detecting errors, are stored in the form of a temperature characteristic curve.

With a particularly advantageous embodiment of the invention, only a comparatively small current flowing in parallel to the sensor is adjusted by the cross regulator with an intact sensor and a maximum current consumption of the sensor. If a current which is smaller by an order of magnitude for instance than with a minimum current consumption of the sensor is adjusted, the overall current consumption is thus advantageously only insignificantly increased by extending the cross regulator. This has a favorable effect on the current consumption of the measurement transducer.

A particularly simple possibility of determining the current flowing in parallel to the sensor is to guide this over a measuring resistance, which is introduced into the path of the current to be determined. The region of occurring current values can be mapped onto a wide voltage range by suitably dimensioning the resistance value to facilitate evaluation. The voltage signal thus generated, the value of which corresponds to the respective value of the current intensity, can be guided for instance for evaluation purposes to an analog-digital converter for digital further processing or can be provided on a comparator input for comparison with a predetermined limit value, to the other input of which a comparison voltage corresponding to the respective predetermined limit value is applied.

An analog-digital converter is usually provided to convert the measuring signal into a digital measured value. In order to improve the measuring accuracy of the measurement transducer, it is advantageous to guide the supply voltage of the sensor to its reference voltage input. This allows for a highly precise ratiometric measurement, which is independent of small fluctuations in the supply voltage of the sensor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

With the aid of drawings, in which exemplary embodiments of the invention are shown, the invention as well as embodiments and advantages are shown in more detail below, in which.

DETAILED DESCRIPTION OF THE EXEMPLARY EMBODIMENTS

Figure 1:
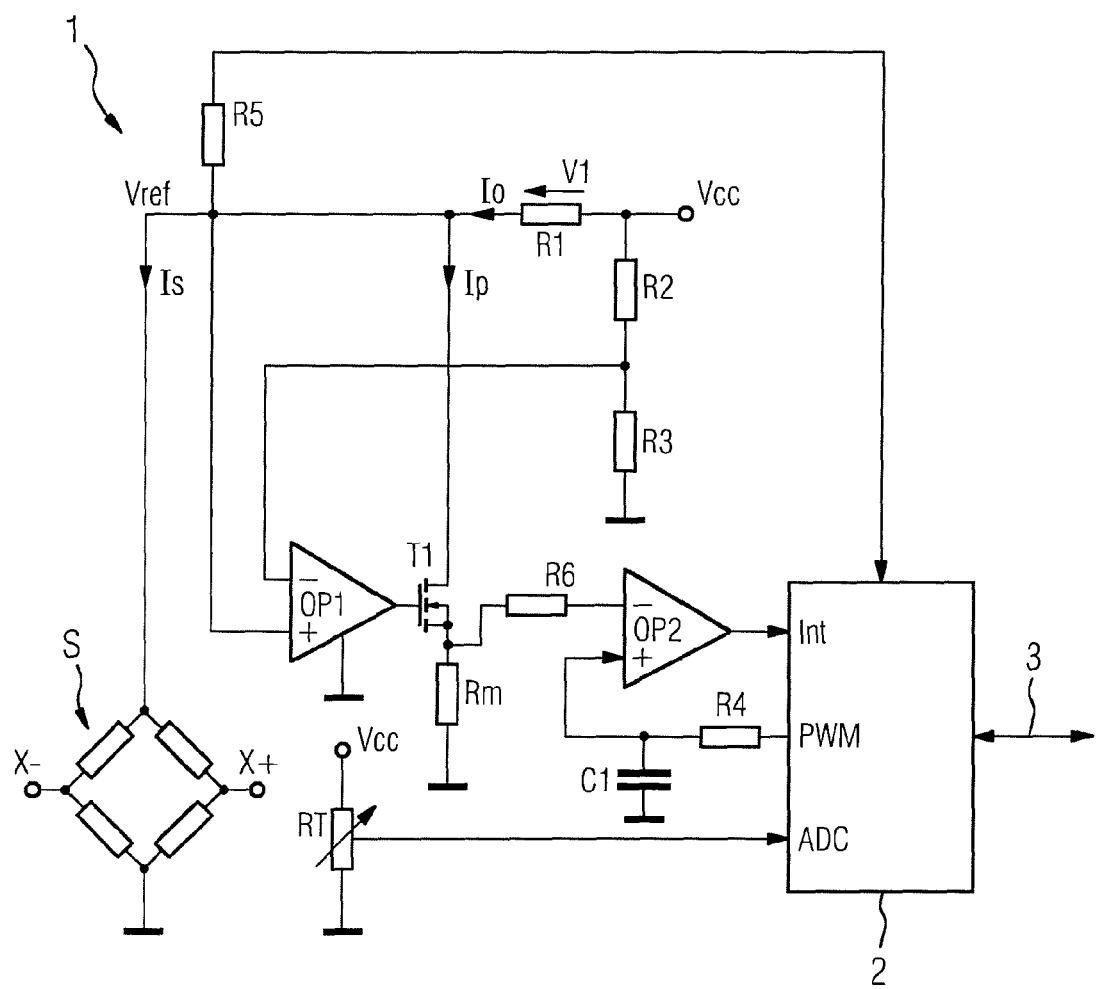
FIG. 1 shows a circuit diagram of a first exemplary embodiment in accordance with the invention.

Corresponding parts are provided with the same reference numerals in the figures.

Only the parts of a measurement transducer 1 which contribute to improved understanding of the invention are shown in FIG. 1, where the measurement transducer is used to detect physical or chemical quantities, such as pressure. Four strain-sensitive resistances of a sensor S are connected to a Wheatstone bridge on a substrate that is formed as a pressure-sensitive membrane. A supply voltage Vref that is essentially constant is applied to this Wheatstone bridge during operation of the measurement transducer. A current Is flows through the sensor S, which essentially consists of the Wheatstone bridge, where the current is dependent on the one hand on the prevailing pressure and, on the other hand, also on the temperature. A voltage can be tapped between terminals X+ and X−, the level of which corresponds to the respective pressure and in the disclosed exemplary embodiment shows the measuring signal that is generated by the sensor. The measuring signal is further processed in a known manner by an activation and evaluation facility 2 to form a measured value for the physical or chemical quantity, which upon use of the measurement transducer 1 is output in a process engineering system to an automation device or a control station via a device, such as a field bus 3.

A current-limiting resistance R1 is connected between a supply voltage Vcc and the constant supply voltage Vref of the sensor S. On account of a cross regulator, which includes a voltage divider made of two resistances R2 and R3, an operational amplifier OP1, a transistor T1 and a measuring resistance connected against earth, is connected in parallel with the sensor S and regulates a voltage V1 dropping across the resistance T1 to a constant value. With a substantially constant supply voltage Vcc, the supply voltage Vref of the sensor S is thus also largely constant and independent of its temperature. Similarly, a current Io flowing across the resistance R1 is kept constant by the cross regulator. A current Ip flowing in parallel to the sensor S and adjusted by the cross regulator therefore behaves in a contraflow manner relative to the current Is which flows through the sensor S. If the ohmic behavior of the sensor S changes due to a fault, such as contamination of the substrate, occurring leakage currents, cracks in the substance, line breakage or short-circuit, the current Ip adjusted by the cross regulator also changes accordingly and as a result thereof the voltage dropping at the resistance Rm changes. A voltage is therefore obtained with the resistance Rm, which corresponds to the current intensity of the current Ip, which in turn behaves in a contraflow manner relative to the current intensity of current Is. The occurrence of a fault on the sensor S can thus be determined by monitoring the determined current intensity of the current Ip for maintaining the specified criteria. In the disclosed exemplary embodiment, the current intensity of the current Ip is monitored for exceeding a predetermined threshold with the aid of an operational amplifier OP2, where the threshold is generated with the aid of a pulse width-modulated output PWM of the activation and evaluation facility 2 and a downstream low pass, which, as an RC element, consists of a resistance R4 and a capacitance C1. The output of the operational amplifier OP2 is guided to a digital input Int in the activation and evaluation facility 2. If a tear or a breakage of the substrate or connecting lines occurs, this results in a level change at the digital input Int. The existing signal state can be determined, for instance, when suitable software is used to program a microprocessor used in the activation and evaluation facility 2 via "polling". Similarly, an interrupt input of the microprocessor can be used, as is the case in the present example.

A temperature dependent resistance RT is used to detect the temperature of the sensor S and is connected to an input ADC of the activation and evaluation facility 2, in which a digital temperature value is determined by analog-digital conversion. With the aid of the respective temperature value, a temperature compensation of the measured value is required on the one hand to improve the measurement accuracy and, on the other hand, an adjustment of the limit value, which is required to monitor the sensor, is implemented in accordance with temperature characteristic curves stored in the activation and evaluation facility 2.

The resistance R5, via which the supply voltage Vref of the sensor S is guided to the activation and evaluation facility 2, enables a ratiometric evaluation of the measuring signal of the sensor S and is thus likewise used to improve the measurement accuracy.

Figure 2:
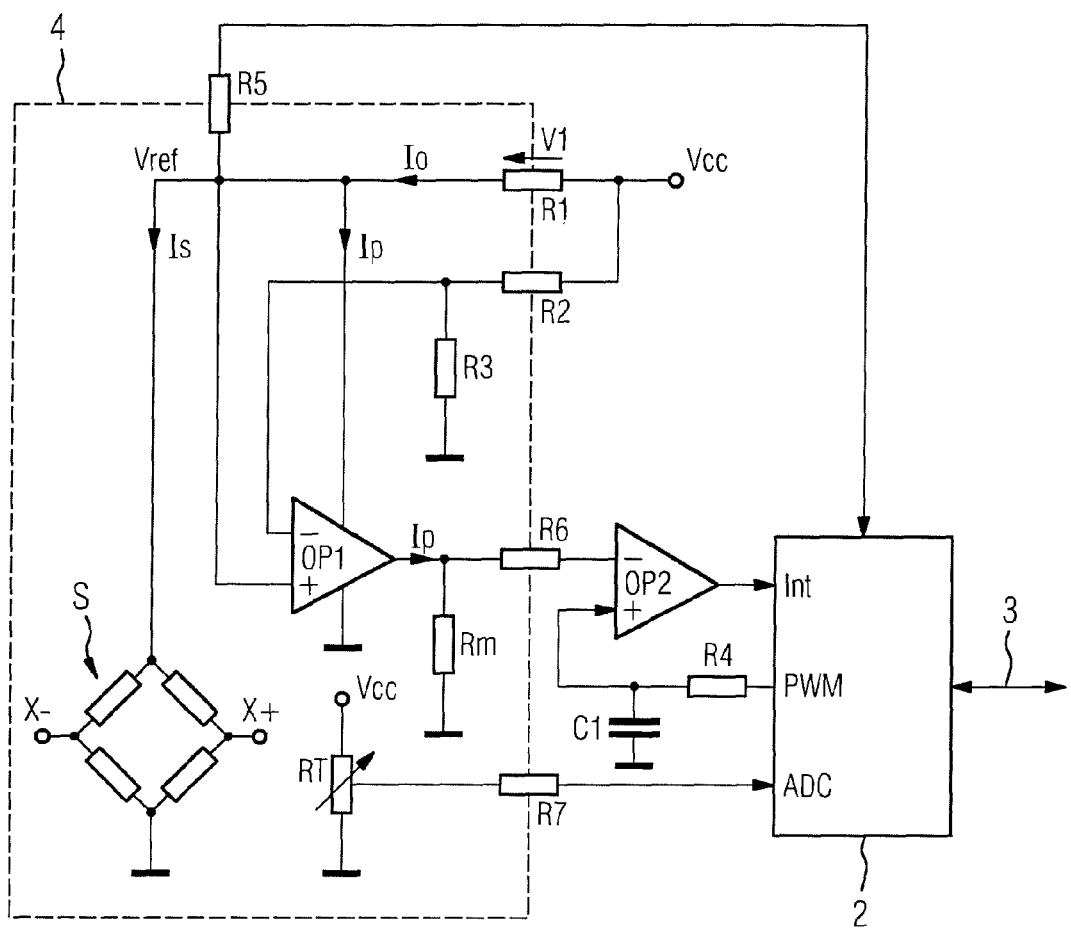
FIG. 2 shows a circuit diagram of a second exemplary embodiment in accordance with the invention.

FIG. 2 shows an exemplary embodiment, which is slightly modified in comparison to FIG. 1, in which a sensor unit 4 is formed for use in a zone 0 where there is a risk of explosion. Here, the resistance R1 is the element that determines the power consumed by the sensor unit 4. The resistances R2, R5, R6 and R7 that are disposed on the border of the power-reduced region of the sensor unit 4 are comparatively highly resistant. The current Ip is adjusted by an output transistor of the operational amplifier OP1, so that it is possible to dispense with an additional transistor (i.e., T1 in FIG. 1).

Figure 3:
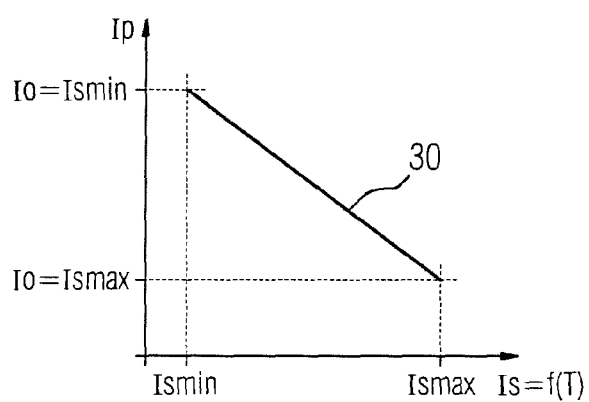
FIG. 3 shows a current diagram in accordance with the invention.

In the current diagram shown in FIG. 3, the dependency of the current Ip flowing in parallel to the sensor on the current Is flowing through the sensor is shown, where the current Is itself in turn is dependent on the temperature T of the sensor in accordance with a function f(T). Depending on the temperature T, the current Is lies between a minimal value Ismin and a maximum value Ismax. The current Ip is adjusted counter thereto by the cross regulator, as indicated in FIG. 3 by a graph 30. With a maximum value Ismax of the current Is, which flows through the sensor, in other words with a maximum current consumption of the sensor, a value Io−Ismax is adjusted for the current Ip. This is comparatively small compared with the maximum current Ismax consumed by the sensor. The current consumption of the sensor unit is thus only increased insignificantly by the cross regulator.

Each of the values of the current Ip to be expected on average at different temperatures can be displayed, for instance, as a characteristic curve above the temperature. Therefore no fault alarms have to be triggered during monitoring on account of component distributions, but in order to detect a sensor malfunction, limit values in the form of a temperature characteristic curve must be stored in the activation and evaluation facility 2 (see FIGS. 1 and 2) that lie slightly thereabove. The limit values can therefore be easily determined by shifting the temperature characteristic curve upwards in parallel by a certain amount, which marginally increases the permissible deviations from the expected values.

Figure 4:
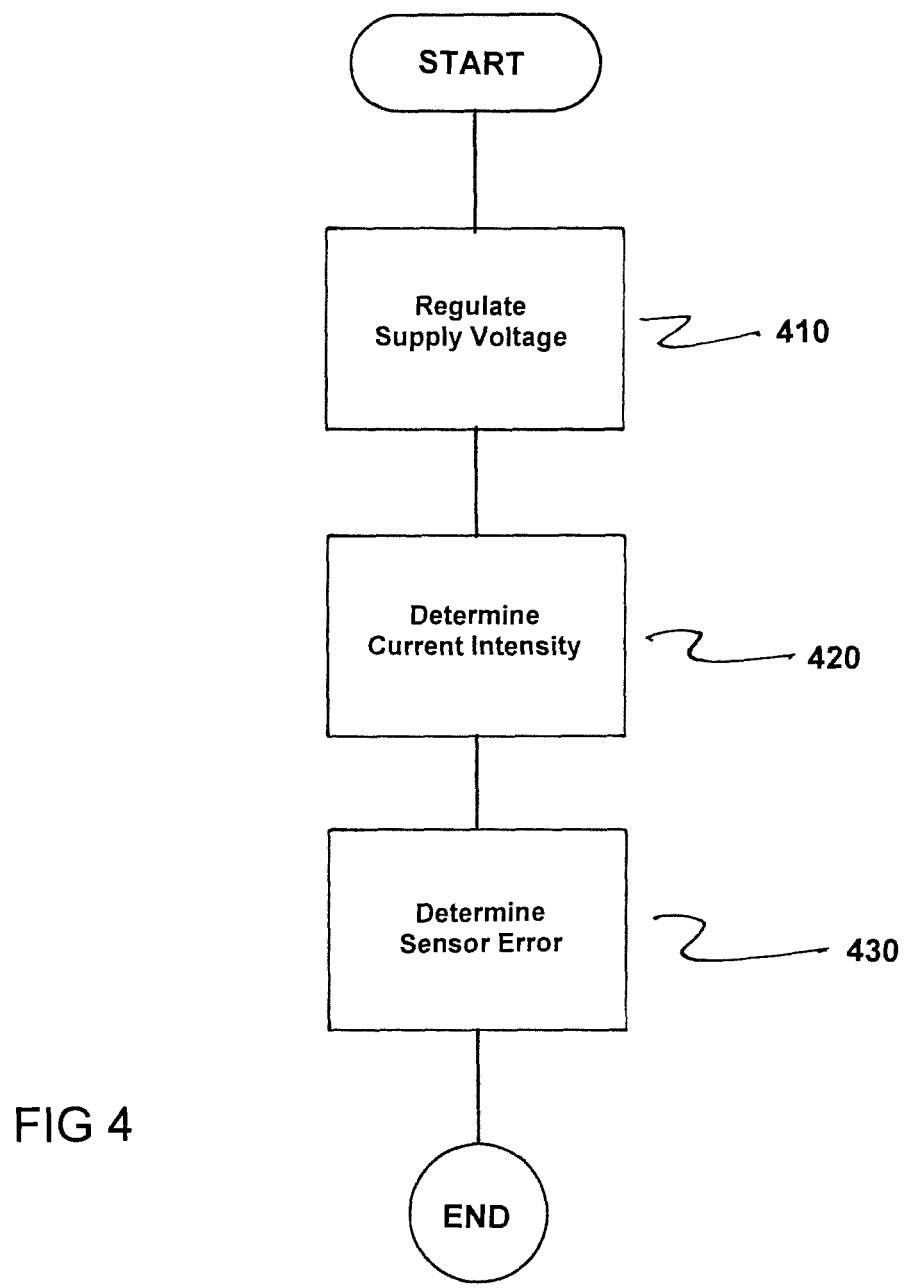
FIG. 4 is a flowchart of the method in accordance with the invention.

FIG. 4 is a flowchart of the method for monitoring the state of a sensor (S) to detect a physical or chemical quantity and to generate a measuring signal (X+, X−) in a measurement transducer (1) for process instrumentation in accordance with the invention, where the measurement transducer includes an activation and evaluation facility (2) for determining and outputting a measured value of the physical or chemical quantity as a function of the measuring signal and the sensor (S) is connected in series with a resistance (R1) in order to monitor for a breakage.

The method comprises regulating a supply voltage (Vref) of the sensor (S) to a constant value by a cross regulator (R2, R3, OP1, T1, Rm) which is connected in parallel, as indicated in step 410.

The current intensity of the current (Ip) adjusted by the cross regulator and flowing in parallel to the sensor (S) is then determined, as indicated in step 420.

Now, the determined current intensity for maintaining a specified criterion is monitored to determine whether a sensor error has occurred, as indicated in step 430. The determined current intensity for maintaining a specified criterion is now monitored to determine whether a sensor error has occurred, as indicated in step 430.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A measurement transducer for process instrumentation comprising:
   a sensor for detecting a physical or chemical quantity and for generating a measuring signal; and
   an activation and evaluation facility for determining and outputting a measured value of the physical or chemical quantity as a function of the measuring signal;
   a resistance connected in series with the sensor to monitor for a breakage; and
   a cross regulator connected in parallel with the sensor to supply the sensor with a constant voltage, determine a current intensity of current adjusted by the cross regulator and flowing in parallel to the sensor, and to detect a sensor error aided by monitoring the determined current intensity for monitoring a specified criterion.

2. The measurement transducer as claimed in claim 1, further comprising:

a temperature dependent resistor for determining a sensor temperature;

wherein, as a specified criterion, the current intensity is monitored to determine whether a limit value is exceeded, which is predetermined as a function of the determined sensor temperature.

3. The measurement transducer as claimed in claim 1, wherein a control area of the cross regulator is predetermined such that, with an intact sensor and at a maximum current consumption of the sensor, only a comparatively small current flowing in parallel to the sensor is adjusted.

4. The measurement transducer as claimed in claim 2, wherein a control area of the cross regulator is predetermined such that, with an intact sensor and at a maximum current consumption of the sensor, only a comparatively small current flowing in parallel to the sensor is adjusted.

5. The measurement transducer as claimed in claim 1, further comprising:

a measuring resistance connected in a path of the current to determine the current intensity of the current flowing in parallel to the sensor.

6. The measurement transducer as claimed in claim 1, wherein the constant supply voltage supplied to the sensor is guided to a reference voltage input of an analog-digital converter, which is provided to convert the measuring signal.

7. A method for monitoring a sensor state to detect a physical or chemical quantity and to generate a measuring signal in a measurement transducer for process instrumentation, the measurement transducer having an activation and evaluation facility for determining and outputting a measured value of the physical or chemical quantity as a function of the measuring signal and the sensor being connected in series with a resistance in order to monitor for a breakage, the method comprising:

regulating a supply voltage of the sensor to a constant value by a cross regulator which is connected in parallel;

determining a current intensity of the current adjusted by the cross regulator and flowing in parallel to the sensor; and monitoring the determined current intensity for maintaining a specified criterion to determine a sensor error.

* * * * *